United States Patent [19]

Fah

[11] Patent Number: 4,864,771
[45] Date of Patent: Sep. 12, 1989

[54] AUTOMATIC PLANT WATERING AND FEEDING SYSTEM

[76] Inventor: Ah N. Fah, 5846 71st St. N., St. Petersburg, Fla. 33709

[21] Appl. No.: 196,372

[22] Filed: May 19, 1988

[51] Int. Cl.$^4$ ............................................. A01G 27/00
[52] U.S. Cl. ........................................ 47/79; 47/48.5; 47/81
[58] Field of Search .................. 47/79, 80, 81, 82, 48.5

[56] References Cited

U.S. PATENT DOCUMENTS

| | | | |
|---|---|---|---|
| 2,818,877 | 1/1958 | Swanson | 47/79 X |
| 2,837,867 | 6/1958 | Courtenay | 47/80 |
| 4,447,983 | 5/1984 | Shinada | 47/79 X |
| 4,557,071 | 12/1985 | Fah | 47/62 X |
| 4,653,529 | 3/1987 | Freeman | 47/79 X |

FOREIGN PATENT DOCUMENTS

| | | | |
|---|---|---|---|
| 194235 | 9/1986 | European Pat. Off. | 47/79 |
| 1296711 | 5/1962 | France | 47/79 |
| 2410201 | 7/1979 | France | 47/79 |

Primary Examiner—Robert A. Hafer
Assistant Examiner—Kevin G. Rooney
Attorney, Agent, or Firm—Erik M. Arnhem

[57] ABSTRACT

An automatic plant watering and feeding system includes a plant vessel supporting a quantity of soil and an underlying water reservoir in communication with the soil by a porous wick. The water reservoir is divided into four chambers. In one chamber a float mechanism controls an input water supply valve while in a second chamber a float mechanism controls the air venting of the first chamber. The third chamber is communicated with the soil by the porous wick and the fourth chamber utilizes a dual interlocking float mechanism to dispense a measured quantity of liquid plant food into the system reservoir during a replenishing cycle.

10 Claims, 5 Drawing Sheets

AUTOMATIC PLANT WATERING AND FEEDING SYSTEM

FIELD OF THE INVENTION

This invention relates generally to plant watering and feeding systems and particularly to those intended to remain unattended for substantial lengths of time.

BACKGROUND OF THE INVENTION

A wide variety of plants have been utilized in various dwelling, workplace, and entertainment environments to beautify and enrich the appearance of the area. A great variety of plant species have been used through the years in such areas which vary in the extent of care and attention required by the plants to maintain their strong healthy and enjoyable appearance. In many instances, such plants are located in environments which render them easy to maintain and care for. However, often such plants are utilized in environments or situations which render their attention and care difficult and/or sporadic. For example, such plant enhancements are frequently located in areas which are difficult to access such as upper portions of rooms or building exteriors. Similarly, such plants are also frequently used within the dwelling places of persons travelling a great deal and therefore absent for prolonged periods of time.

The need to maintain the care and feeding of such plants under such difficult situations has prompted practitioners in the art to devise a number of devices which in varying degrees are intended to provide for the needs and care of such plants with little or no attention.

For example, U.S. Pat. No. 3,261,125 issued to Arkebauer sets forth a motion controlling system for plants which utilizes a wooden block as sensing means for the control and operation of the watering system.

U.S. Pat. No. 3,534,498 issued to Herrli sets forth a plant watering system which utilizes a porous elongated wick to communicate water to the plant soil from the reservoir by capillary action of the wick.

U.S. Pat. No. 3,747,399 issued to Treirat sets forth a plant watering system utilizing a capillary material in combination with a porous wick to control soil moisture.

U.S. Pat. No. 3,775,904 issued to Peters sets forth a double-walled plant supporting device within which a vacuum in created and thereafter relieved in a controlled process to flow water to the plant soil at the appropriate rate.

British Application No. 2,095,083 in the name of Fah published in 1982, but subsequently withdrawn, describes a plant container having a double wall and double bottom in which a supply of water is maintained at a controlled level between the device bottoms by a float system and in which a porous wick extends from the water supply to the plant soil.

U.S. Pat. No. 4,557,071 issued to Fah sets forth a automatic watering and feeding system for plants in which a plant container includes a soil section supporting soil and plants and a reservoir section for accommodating water. A porous wick communicates water from the reservoir to the soil and a pair of floats in communication with the reservoir operate first and second magnetic means which cooperate to maintain the appropriate water level and provide for periodic operation of a food dispenser.

While the foregoing described prior art devices have with varying degree of success attempted to provide environments for plants utilizing and requiring less care and attention, there remains a need in the art for a fully automated reliable and self-sustaining automatic system for plant watering and feeding.

SUMMARY OF THE INVENTION

Accordingly, it is a general object of the present invention to provide an improved automatic plant watering and feeding system. It is more particular object of the present invention to provide an improved automatic plant watering and feeding system which is operable when coupled to water systems having different residual pressures. It is a still more particular object of the present invention to provide an improved automatic plant watering and feeding system in which the plant fertilizer dispenser operates consistently notwithstanding wide temperature variations and which is easier to maintain and refill.

In accordance with the invention, there is provided an improved automatic plant watering and feeding system having a soil retaining vessel and a water reservoir in communication via a porous wick. Water level control means are coupled to a conventional water supply and are operative to maintain the water level in the reservoir within a predetermined range. A plant food reservoir includes means for periodically dispensing a quantity of plant food when the water level in the water reservoir reaches a predetermined level.

BRIEF DESCRIPTION OF THE DRAWINGS

The features of the present invention, which are believed to be novel, are set forth with particularly in the appended claims. The invention, together with further objects and advantages thereof, may best by understood by reference to the following description taken in conjunction with the accompanying drawings, in the several figures of which like reference numerals identify like elements and in which:

DESCRIPTION OF THE PREFERRED EMBODIMENT

Figure 1:
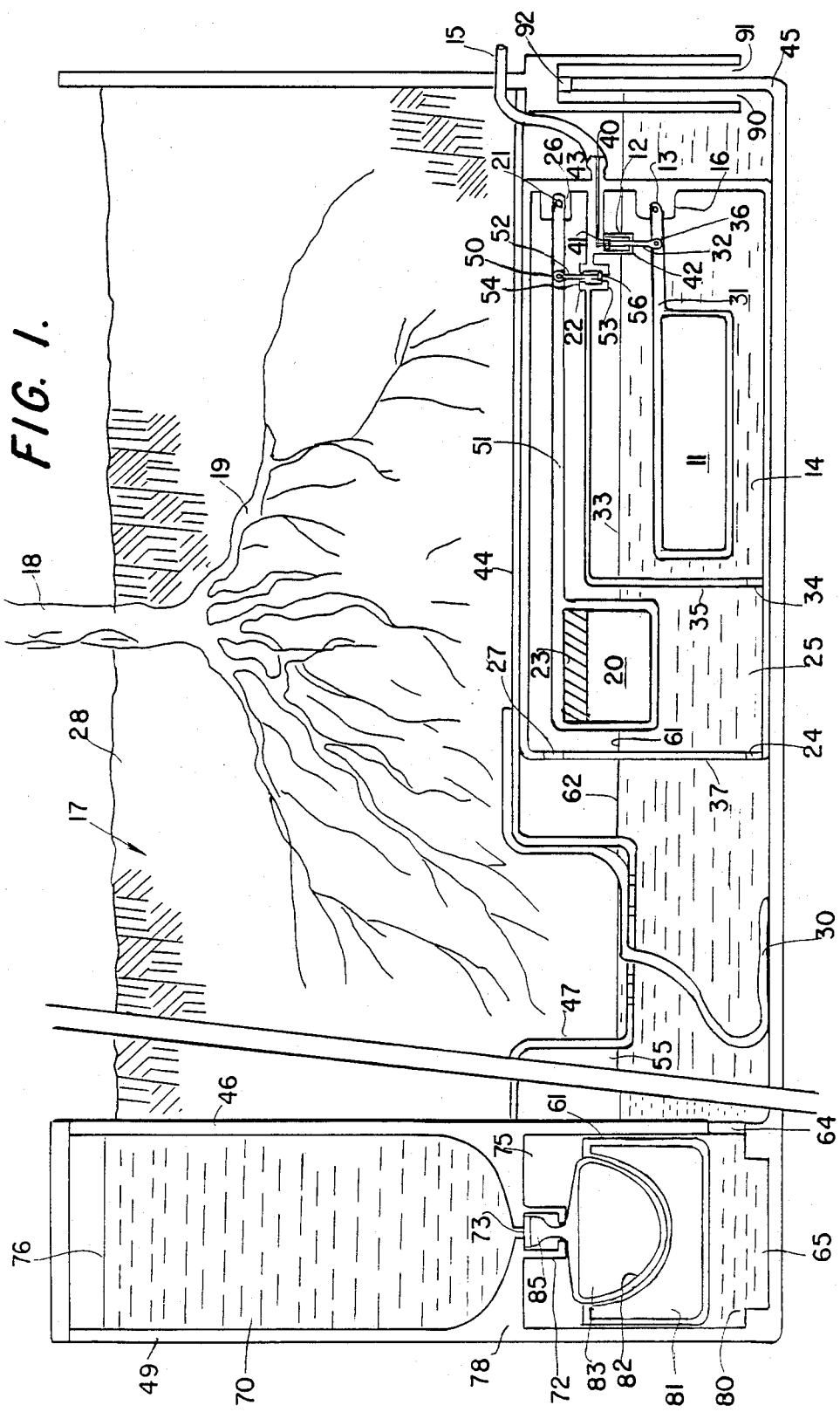
FIG. 1 sets forth a pictorial view of the present invention improved automatic plant watering and feeding system following the completion of a replenishment cycle.

FIG. 1 sets forth a pictorial view of the present invention improved automatic plant watering and feeding system generally referenced by numeral 10. Watering system 10 includes a side wall 45, a side wall 49 and a bottom wall 48 joined to form a continuous surrounding container having an open top portion. A floor member 44 extends inwardly from wall 45 and defines a recess 47. A wall 46 is spaced from wall 49 and extends downwardly to join bottom 48. Floor 44 joins wall 46 forming a soil cavity 17 between wall 46, bottom floor 44 and wall 45. A quantity of soil 28 is deposited within soil cavity 17 and in accordance with conventional planting techniques a plant 18 is supported within soil 28 such that a plurality of roots 19 extend outwardly to substantially permeate soil 28. A continuous wall 35 forms an interior chamber 14 having an aperture 34 and an inwardly extending flange 16. Wall 35 further defines an input passage 40 which is coupled to a water supply input 15. Water supply input 15 may, for example, comprise a conventional coupling to a standard municipal water supply. A water valve 12 is supported by wall 35 and defines a valve seat 41 and a valve seat 42. A float 11 includes an elongated arm 31 coupled to flange 16 by a hinge 13. In accordance with conventional fabrication techniques, float 11 is substantially lighter than the water it displaces and therefore is pivotally moved about hinge 13 in response to changes in water level within chamber 14. A valve rod 32 terminates in a valve stop 43 within water valve 12 at one end and a pivotal attachment 36 at the other end. Pivot 36 is secured to arm 31 of float 11 in a pivotal attachment.

An air valve 22 is defined within wall 35 and includes a valve seat 53 within chamber 14 and a valve seat 54 exterior to chamber 14. A wall 37 extends across bottom 48 and upwardly therefrom to floor 44 to form a chamber 25. Chamber 25 receives and continuously surrounds chamber 14 and defines an aperture 24 and an aperture 27. Wall 37 further defines an inwardly extending flange 26. A float 20 includes a balancing weight 23 and an elongated arm 51. Arm 51 terminates in a hinge 21 which is pivotally secured to flange 26. A valve rod 52 having a pivot 50 at one end is secured to arm 51 and defines a valve stop 53 supported within air valve 22 at the other end.

A plant food reservoir 70 is formed between walls 46 and 49 and maintains a quantity of plant food therein having a plant food level 76. Plant food reservoir 70 further includes a downwardly extending passage 71. A valve 72 includes a valve seat 73 in communication with passage 71 and a valve seat 74 extending downwardly therefrom. A chamber 75 is formed between walls 46 and 49 and is separated from plant food reservoir 70 by a wall 78. Chamber 75 further defines an aperture 64 and a recess 65. Recess 65 is surrounded by an inwardly extending lip 80. A float 81 is configured to correspond generally to chamber 75 and defines a downwardly extending recess 82. A float 83 having a generally convex configuration is adapted to generally fit within recess 82 and defines an upwardly extending valve rod 84. Rod 84 further defines a valve stop 85.

A chamber 55 is formed between wall 37 of chamber 25 and wall 46 of chamber 75 and receives downwardly extending recess 47. Recess 47 defines a plurality of apertures 60 communicating chamber 55 with soil cavity 17. In accordance with an important aspect of the present invention, an elongated porous wick 30 is received partially within chamber 55 and extends through a selected one of apertures 60 and therefrom extends upwardly into soil cavity 17.

An overflow passage 90 extends upwardly from chamber 55 and is coupled to a similar overflow passage 91 exterior to chamber 55 by a coupling 92. Overflow passages 90 and 91 together with coupling 92 provide an overflow mechanism limiting the water level within chamber 55 in accordance with the operation set forth below in greater detail.

In operation, a quantity of water is received within chambers 55, 14, 25 and 75 during the replenishment cycle described below. As mentioned above, FIG. 1 sets forth the configuration of the present invention system 10 which results following the completion of a replenishment cycle. Accordingly, a quantity of water is present within chambers 55, 14, 25 and 75 having water levels 62, 33, 61 and 63 respectively. It should be noted that in accordance with the system operation set forth below in greater detail at the completion of a replenishment cycle, water levels 62, 33, 61 and 63 within the system are substantially equal. In the positions shown, float 11 is submerged beneath water level 33 and due to its buoyancy exerts an upward force upon rod 32 which in turn forces stop 43 against valve seat 41 of water valve 12 causing a closure of input passage 40 and inhibiting the flow of water through input passage 40 from water supply 15. Thus, water valve 12 is closed and remains so until the upward force upon float 11 caused by water level 33 is removed. Similarly, float 20 is buoyantly supported by the water within chamber 25 causing arm 51 to assume a generally horizontal position about hinge 21. It should be noted that weight 23 is selected to provide the proper angular position of arm 51 when water level 61 reaches the level shown at the completion of a replenishment cycle. Rod 52 coupled to arm 51 is maintained in the intermediate position shown such that stop 53 is spaced from both seats 53 and 54 of air valve 22. Thus, air valve 22 is open providing an air passage between chambers 25 and 14. Within chamber 55 the quantity of water provided by the previously occurring replenishment cycle is present at water level 62. The water within chamber 55 is carried by wick 30 upwardly in accordance with conventional capillary action within wick 30 and is drawn into soil 28 within soil cavity 17. The capillary action of wick 30 provides the primary movement of water to soil 28 for use by plant 18.

With a quantity of water within chamber 75 rising to water level 63 as shown, float 81 is urged upward by its buoyant force which in turn provides an upward force against float 83. Thus, in accordance with an important aspect of the present invention, floats 81 and 83 are generally coupled together as a single unit so long as a buoyant force is applied to float 81 urging it upwardly. The upward force upon float 83 produces an upward motion of rod 84 within valve 72 forcing valve stop 85 against valve seat 73. The pressure of stop 83 against valve seat 73 closes passage 71 and isolates chamber 75 from plant food reservoir 70. Thus, in the position shown, water supply valve 12 is closed precluding the flow of water from water supply input 15 into chamber 14. Air valve 22 is open permitting an air coupling between chambers 14 and 25 and valve 72 is closed which cuts off the flow of plant food from plant food reservoir 70 into chamber 75. With the situation as depicted in FIG. 1, the passage of time causes water to be steadily drawn upward through wick 30 for absorption into soil 28 as needed by plant 18. This process continues which gradually depletes the water supply from chambers 55, 14, 25 and 78 until the configuration set forth in FIG. 2 results.

Figure 2:
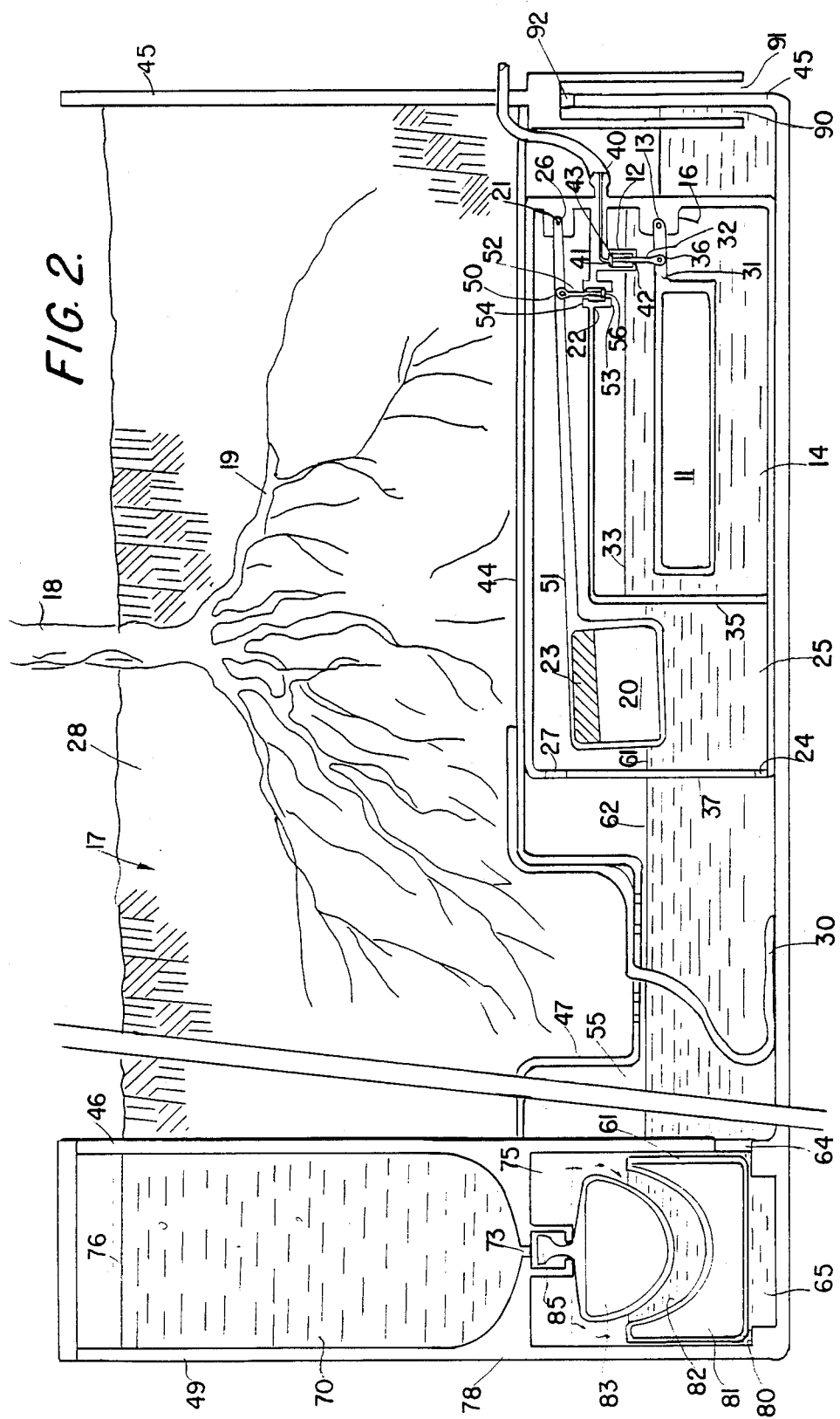
FIG. 2 sets forth a pictorial drawing of the present invention improved automatic plant watering and feeding system following an extended period of water usage.

FIG. 2 sets forth the present invention system following an extending period of time during which a quantity of water has been drawn upwardly through wick 30 by the action of plant 18. It should be noted that the system set forth in FIG. 2 is identical to that set forth in FIG. 1 with the sole differences between FIG. 1 and 2 being those positional changes in the present invention apparatus which result from the foregoing absorption of water by plant 18. By comparison of FIGS. 1 and 2, it should be noted that water level 62 within chamber 55 has been substantially reduced from the level shown in FIG. 1 following replenishment. Correspondingly, the communication of water between chambers 25 and 55 via aperture 24 and the equalizing of air pressure therebetween via aperture 27 provides that water levels 61 and 62 remain equal to each other. Similarly, the communication between chambers 75 and 55 via aperture 64 causes water level 63 within chamber 75 to be similarly reduced and equal to water levels 61 and 62. The reduction in water level 63 within chamber 75 permits float 81 to move downwardly which in turn removes the upward pressure upon float 83 causing stop 85 to be removed from valve seat 73 which in turn permits a flow of plant food from plant food reservoir 70 through passage 71 and valve 72 into chamber 75. The flow of plant food from reservoir 70 is carried generally downwardly across the upper portion of float 83 and accumulates within recess 82 of float 81. As the flow of liquid plant food through passage 71 and valve 72 downwardly into recess 82 continues, float 83 is force upwardly by its own buoyant force within recess 82 due to the accumulated liquid plant food within recess 82. At some point, the upward force upon float 83 becomes sufficient to again force stop 85 against valve seat 73 and thereby close passage 71 and terminates any further flow of plant food from plant food reservoir 70. As a result, floats 81 and 83 assume the positions shown in FIG. 2 in which an accumulated supply of liquid food has collected within recess 82 and supports float 83. Concurrently, the reduction of water level 61 permits float 20 to pivot about hinge 21 in a counterclockwise direction which in turn forces rod 52 downwardly within air valve 22 until stop 56 is forced against seat 53 closing air valve 22. With air valve 22 closed, the flow of equalizing water through aperture 34 which would otherwise maintain water level 33 at the same level as water level 61 is precluded. Thus, the continued absorption of water by plant 18 through wick 30 is carried forward without further reducing water level 33 within chamber 14. As a result, notwithstanding the further drops in water levels 61, 62 and 63 in chambers 25, 55 and 75 repsectively, the maintenance of water level 33 at a higher level due to the closure of air valve 22 provides a continued closure of water valve 12 precluding the addition of any more water to the system. The above-described absorption of water by plant 18 through wick 30 continues to deplete the supply of water in chambers 25, 55 and 75 until the system reaches the situation shown in FIG. 3.

Figure 3:
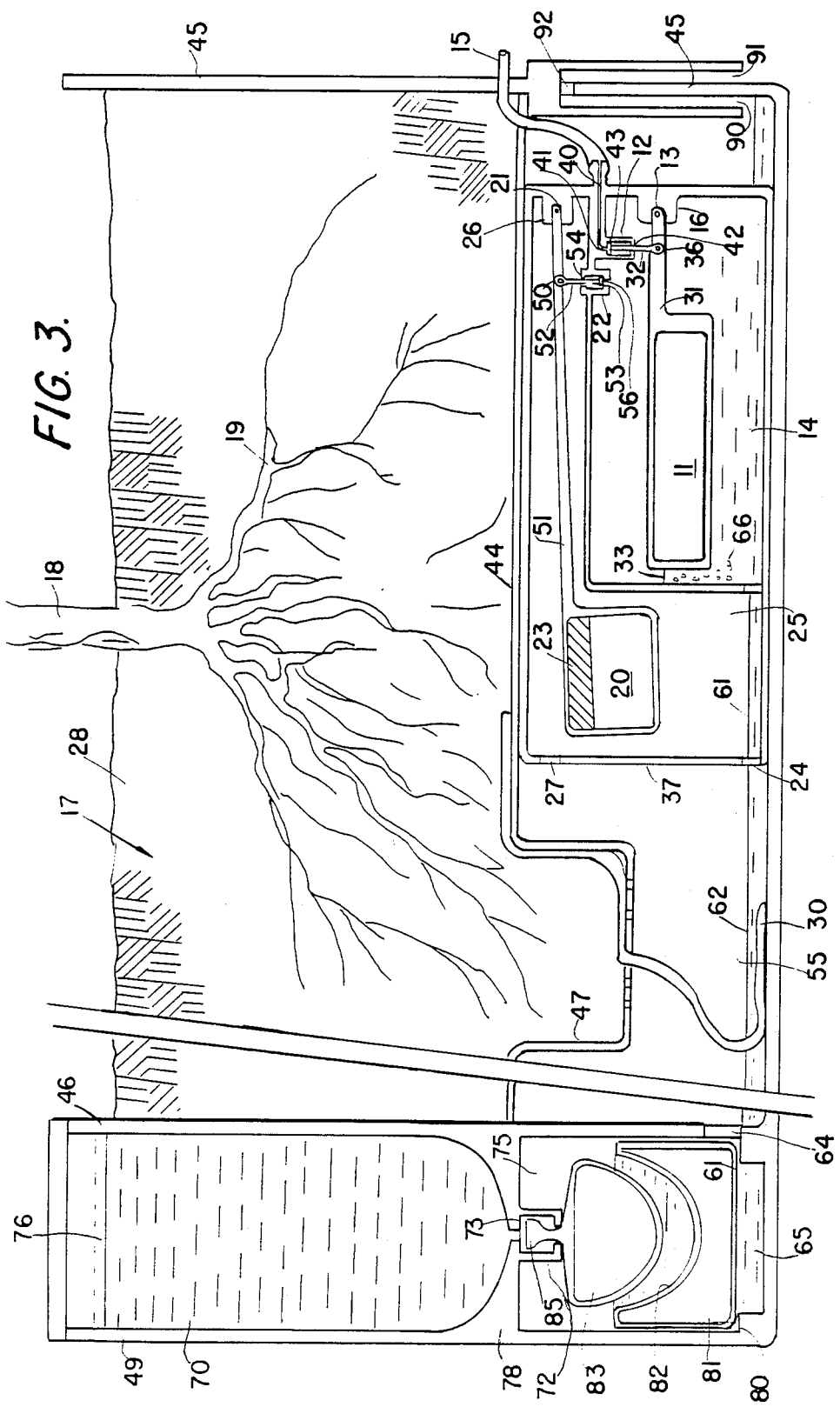
FIG. 3 sets forth a pictorial drawing of the present invention improved automatic plant watering and feeding system in which the water has been consumed to the minimum water level.

FIG. 3 sets forth the present invention system as it appears when the use of water by plant 18 has caused the reduction of system water levels to reach their minimum levels. As is seen in FIG. 3, the continued absorption of water by wick 30 has reduced water level 62 within chamber 55 to a point below aperture 64 causing a retention of water within recess 65. Correspondingly, the reduction of water level 63 within recess 75 causes float 81 to rest upon lip 80 above recess 65 prohibiting further downward movement of float 81. As float 81 is moved downward in the transition from the water levels shown in FIG. 2 to the minimum water levels shown in FIG. 3, the above-described operation of float 83 and valve 72 continue to transport quantities of liquid plant food from plant food reservoir 70 to recess 82 of float 81. As a result, a substantial quantity of liquid plant food now resides within recess 82 of float 81. Concurrently, the reduction of water level 62 has reached a point below apertures 34 and 24. The reduction of water level 61 within chamber 25 causes float 20 to continue to maintain closure of air valve 22. However, the reduction of water level 61 beneath aperture 34 permits the bubbling via air bubbles 66 into chamber 14. Thus, as air bubbles 66 diffuse upwardly within chamber 14, sufficient air pressure is provided above water level 33 notwithstanding the closure of air valve 22 to permit water to flow outwardly through aperture 34 into chambers 25 and 55 to supply wick 30 with additional water for absorption by plant 18. This operation continues as air bubbles 66 diffuse upwardly permitting the flow of water from chamber 14 and causing a gradual reduction in water level 33. This process continues until the reduction of water level 33 reaches a sufficiently low level to permit float 11 to move downwardly causing a counterclockwise rotation of arm 31 about hinge 13 which in turn relieves the closing force of stop 43 against valve seat 41 of water valve 12 allowing the system to initiate a replenishing cycle and assume the positions shown in FIG. 4.

Figure 4:
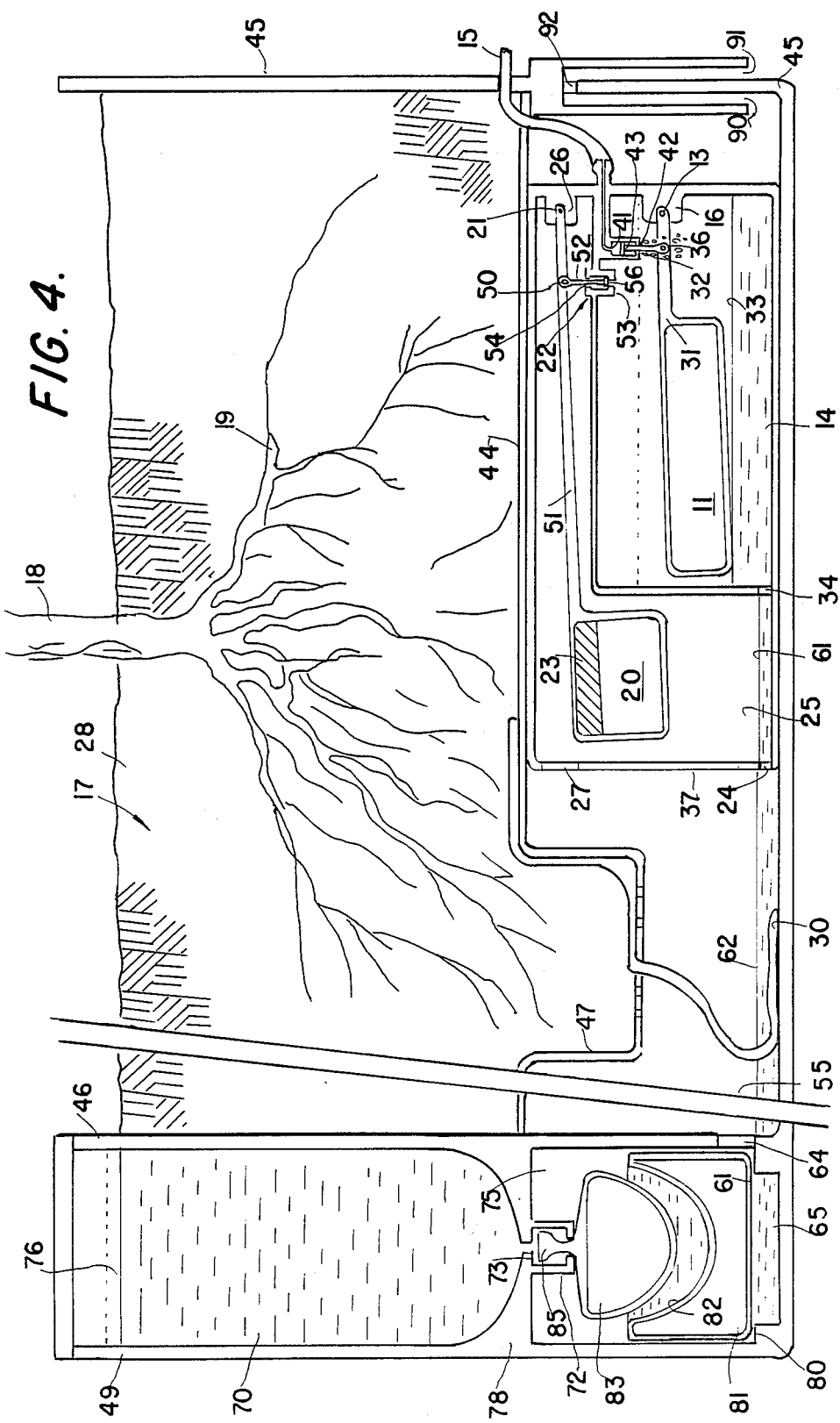
FIG. 4 sets forth a pictorial drawing of the present invention improved automatic plant watering and feeding system at the initiation of a replenishing cycle.

FIG. 4 sets forth the present invention system at the initiation of a replenishing cycle. As can be seen, the downward motion of float 11 described above has resulted in the opening of water supply valve 12. With the opening of valve 12, pressurized water flows from water supply input 15 through input passage 40 and valve 12 into chamber 14. As water flows into chamber 14, water level 33 is raised which in turn causes closure of aperture 34 causing a cessation of the above-described air bubbling action. Because float 20 remains in its downward position within chamber 25, air valve 22 remains closed and chamber 14 is once again sealed and a body of air is captivated within chamber 14 above water level 33. Because of the pressure within the water supply system to which water supply input 15 is coupled, the flow of water through water valve 12 continues causing water level 33 to rise and causing the trapped air within chamber 14 to become pressurized. Thereafter, the combination of pressure of the trapped air within chamber 14 and the water pressure of the water supply to which input 15 is coupled, causes water to flow outwardly from chamber 14 through aperture 34 into chamber 25 and through aperture 24 into chamber 55. As water flows outwardly from chamber 14 into chambers 25 and 55, water levels 61 and 62 respectively again begin rising. As water levels 61 and 62 continue to rise, water level 62 rises above the lower portion of aperture 64 permitting water to once again flow into chamber 75. The flow of water into chamber 75 forces float 81 upwardly which in turn forces float 83 into recess 82 such that liquid plant food is displaced from recess 82 and flows downwardly within chamber 75 to mix into the accumulated water within chambers 75 and 55. Thus, liquid plant food is mixed into the system's water reservoir and particularly within chamber 55. The filling process continues and water levels 61, 62 and 63 continue to rise until water level 61 again reaches float 20 and begins moving float 20 upward.

Figure 5:
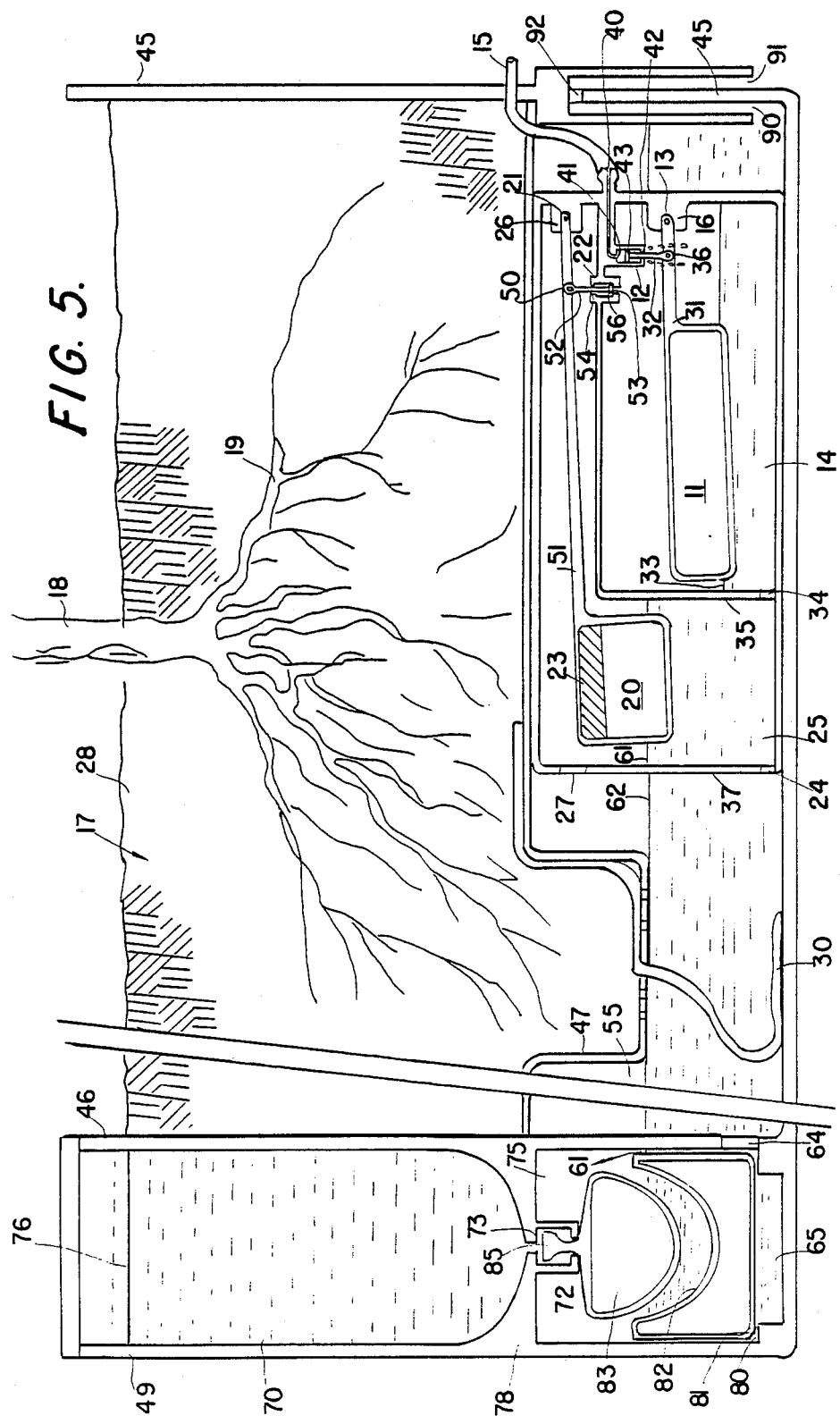
FIG. 5 sets forth a pictorial drawing of the present invention improved automatic plant watering and feeding system near the completion of a replenishing cycle.

FIG. 5 sets forth the near completion of the above-described replenishing cycle in which water level 61, 62 and 63 have risen to a sufficient level that water level 61 within chamber 25 begins raising float 20 causing a rotation of arm 51 in the clockwise direction. It should be noted that weight 23 is selected to control the point at which water level 61 again raises float 20. The raising of float 20 and the clockwise rotation of arm 51 caused thereby raises rod 52 which removes stop 56 from seat 53 of air valve 22. As a result, the air passage to chamber 14 is again opened and the pressurized air trapped above water level 33 is released which in turn permits water level 33 to rise to the same levels as water levels 61, 62 and 63. As water level 33 rises, float 11 is carried upward rotating arm 31 in the clockwise direction about hinge 13 and causing stop 43 to be forced against valve seat 41 and close input passage 40 prohibiting any further flow of replenishing water into the system. During the time that water levels 61, 62 and 62 are raised to the final water levels shown in FIG. 1, float 81 is forced upwardly against float 83 causing the displacement of virtually all of the plant food collected within recess 82. The displaced plant food continues to flow downwardly about the exterior of float 81 within chamber 75 and is mixed with the water supplies within chambers 75 and 55 and to a lesser extent, chambers 25 and 14. As a result, once the system completes its replenishing cycle and returns to the positions shown in FIG. 1, a complete fresh charge of plant food and water mix has once again been stored within chambers 75, 55, 25 and 14 and the replenishing cycle is complete.

As can be seen, the above-described replenishing cycle takes place automatically without the need of any care or attendance and provides for a systematic and consistent infusion of plant food to the water supply to plant 18. As will be further apparent, the system is independent of water supply pressure in that the flow of water and the levels to which the water is permitted to rise within the system are controlled solely by the valve mechanisms and are independent of the water supply pressure. As a result, the system is not effected by changes in water supply pressure while left unattended. Similarly, it should be noted that the volume of liquid plant food dispensed during each replenishing cycle is consistent and is unaffected by the pressure of the water supply system and is equally unaffected by variations in ambient temperature and other like environmental circumstances. As a result, the system functions reliably, efficiently and consistently requiring nothing more than periodic replenishment of the supply of liquid plant food within plant food reservoir 70.

While particular embodiments of the invention have been shown and described, it will be obvious to those skilled in the art that changes and modifications may be made without departing from the invention in its broader aspects. Therefore the aim in the appended claims is to cover all such changes and modifcations as fall within the true spirit and scope of the invention.

That which is claimed:

1. A plant watering and feeding system comprising:
    a soil cavity for supporting a quantity of soil;
    a first cell having a first closed continuous wall defining a first interior cavity and first, second and third apertures;
    a second cell having a second closed wall defining a second interior cavity communicating with said first interior cavity through said first and second apertures;
    a third cell having a third closed wall defining a third interior cavity and a fourth aperture communicating with said second interior cavity;
    a fourth cell having a fourth closed wall defining a fourth interior cavity communicating with said first interior cavity through said third aperture;
    transfer means coupled between said first interior cavity and said soil cavity;
    inlet means for introducing water into said third interior cavity from a water source having a water valve controlling water flow and a first float operatively coupled to and controlling said water valve, water introduced into said third interior cavity being capable of flowing into said second, first and a fourth interior cavities through said fourth, first and third apertures respectively;
    an air valve extending through said third continuous wall for venting said third interior cavity;
    a second float movably supported within said second interior cavity and operably coupled to said air valve;
    transfer means for coupling water from said first interior cavity to said soil cavity; and
    plant food dispensing means for introducing plant food into said fourth cavity in reponse to variations of the water level within said fourth cavity.

2. A plant watering and feeding system as set forth in claim 1 wherein said water valve opens when said first float moves downwardly in response to a lack of water within said third interior cavity causing water to flow into said first, second, third and fourth interior cavities establishing water levels within said first, second and fourth interior cavities which are higher than the water level within said third interior cavity and wherein said air valve and said second float cooperate to preclude venting of said third interior cavity until the water level within said second cavity exceeds a predetermined level.

3. A plant watering and feeding system as set forth in claim 2 wherein said plant food dispensing means includes:
    a third float movable within said fourth interior cavity defining a recess;
    a fourth float having a convex portion received within said recess;
    a plant food reservoir for supporting a quantity of plant food; and
    a food valve operatively coupled to said fourth float opening when said fourth float descends to cause a flow of plant food into said recess and close said food valve at a predetermined level.

4. A plant watering and feeding system as set forth in claim 3 wherein said third float is driven upwardly by increases of water level within said fourth interior cavity forcing said third and fourth floats together and expelling said plant food from said recess.

5. A plant watering and feeding system as set forth in claim 4 wherein said transfer means includes a porous wick extending between said first cavity and said soil cavity.

6. A plant watering and feeding system as set forth in claim 5 wherein said soil cavity is supported above said first cell.

7. A plant watering and feeding system as set forth in claim 6 wherein said first closed wall defines a recess and a plurality of recess apertures therein such that additional water is passed into said soil cavity when the water level within said first interior cavity rises above said plurality of recess apertures.

8. A plant watering and feeding system as set forth in claim 7 wherein said third cell is enclosed within said second cell.

9. A plant watering and feeding system as set forth in claim 8 wherein said second cell is enclosed within said first cell.

10. A plant watering and feeding system as set forth in claim 9 wherein said first cell includes an overflow passage for permitting excess water to escape.

* * * * *